Dec. 10, 1968     F. BATE     3,415,704
HEAT SEALING OF PLASTICS FILM

Filed Aug. 9, 1965     2 Sheets-Sheet 1

INVENTOR:
FRED BATE
BY
Norris & Bateman
attys

Dec. 10, 1968   F. BATE   3,415,704
HEAT SEALING OF PLASTICS FILM
Filed Aug. 9, 1965   2 Sheets-Sheet 2

INVENTOR:
FRED BATE
BY
Norris & Bateman
Attys.

3,415,704
HEAT SEALING OF PLASTICS FILM
Fred Bate, Nelson, England, assignor to Rotostar S.p.A., Ceprano, Frosinone, Italy, a corporation of Italy
Filed Aug. 9, 1965, Ser. No. 478,045
Claims priority, application Great Britain, Aug. 14, 1964, 33,197/64
5 Claims. (Cl. 156—515)

ABSTRACT OF THE DISCLOSURE

A heat sealing and severing device for plastics film wrapping successive packages has an anvil and a sealing and severing head which rotate in unison so that they register in engagement with the film between each adjacent pair of packages. A radially reciprocable spring biased sealing member on the head carries an electrical resistance heating wire, and a cam rotating in unison with the sealing and severing head presses the sealing member into engagement with film at the anvil at each revolution.

---

Plastics film is frequently severed and simultaneously sealed by the application of heat, especially in wrapping machines. The present invention provides apparatus for heat severing and/or sealing plastic film which is particularly applicable to continuous processes as in wrapping machines.

According to this invention a heat severing and/or sealing arrangement for plastics film has an anvil and a heating element mounted for rotation about parallel axes there being driving means adapted to rotate the anvil and heating element in unison, and pressure means for pressing the two together at the point in the cycle where they are facing each other.

Preferably the pressure means comprises a rotary cam or pressure member also driven in unison with the anvil and the heating element, and adapted to engage the heating element to press it towards the anvil.

An arrangement in accordance with the invention can be used to sever and seal together two layers of plastics film in front of and behind partly wrapped packages, the package passing between the anvil and the heating element when they are not facing each other.

Figure 1:
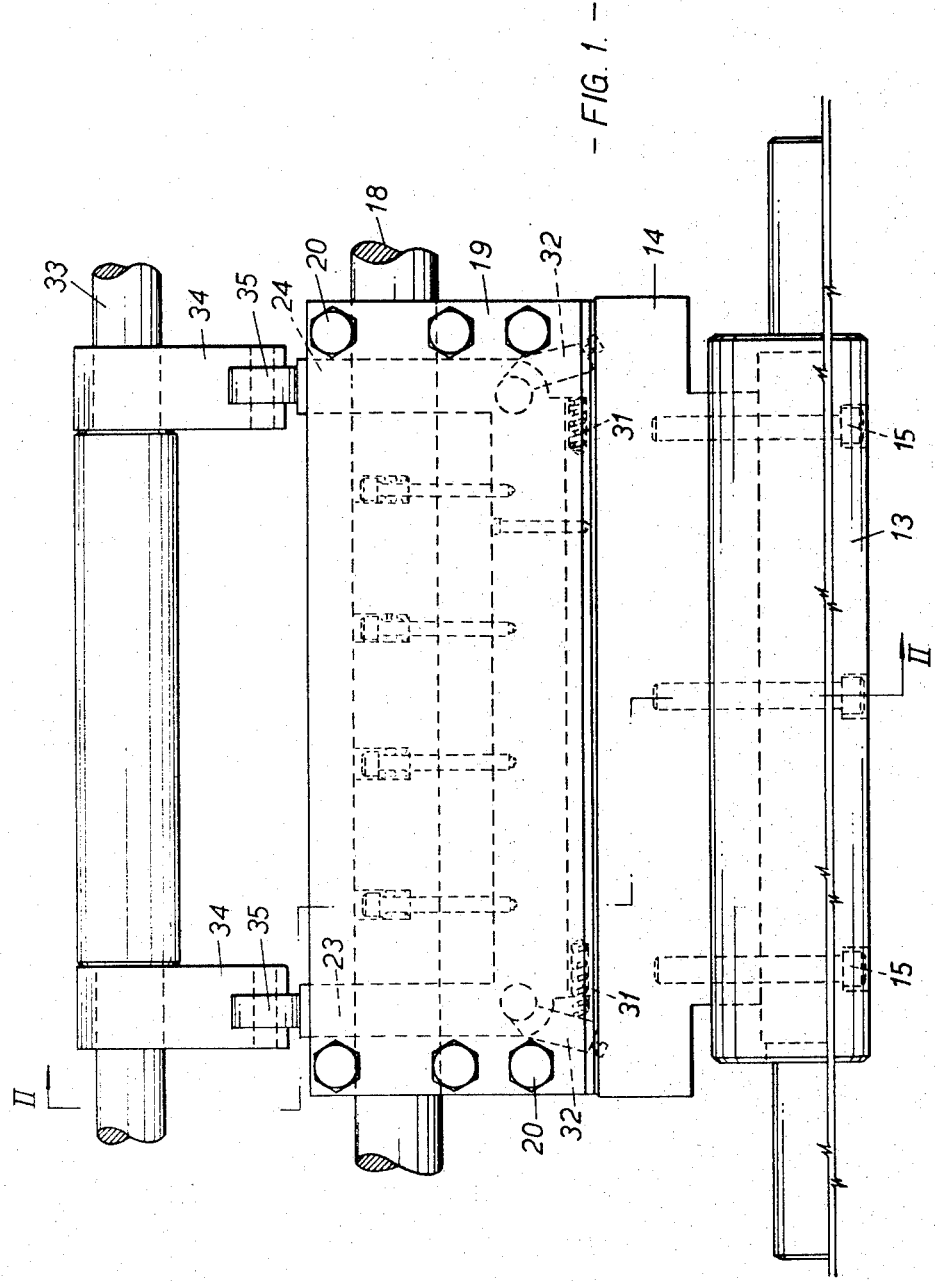
Figure 2:
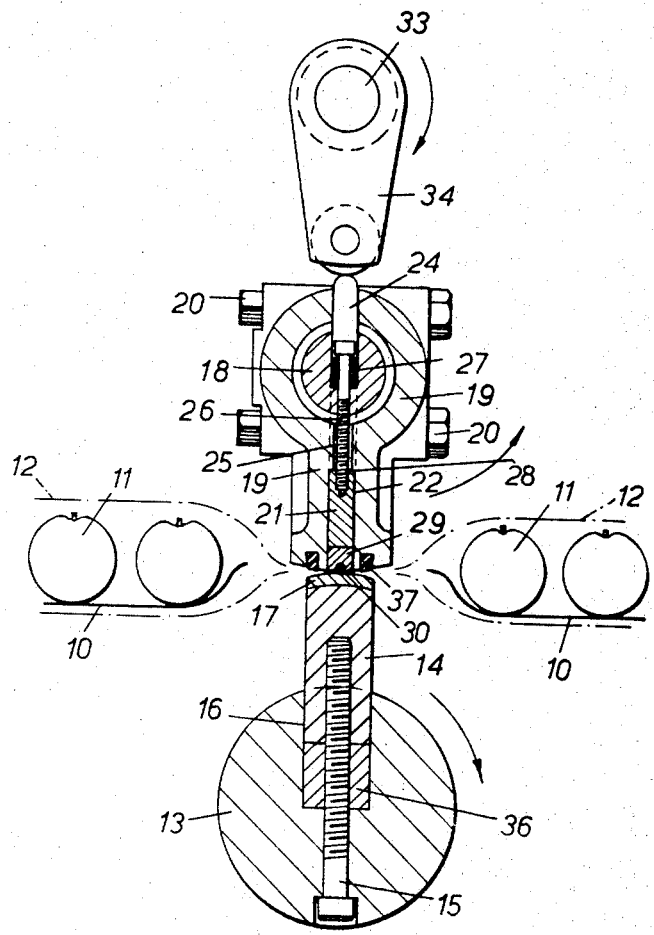

One construction of a heat severing and sealing arrangement for plastics film, which is used in an automatic wrapping machine will now be described by way of example only, with reference to the accompanying drawings, in which:

FIGURE 1 is a front view of the arrangement at the time in the machine cycle when a seal is being effected, and FIGURE 2 is a section through the arrangement on the line II—II in FIGURE 1.

This arrangement is intended to be used in a wrapping machine where the articles to be wrapped pass through a series of wrapping stations where a film of plastics sheet is laid over the articles and the edges of the sheet are folded under the articles. In the application illustrated in the drawings, each article to be wrapped comprises an open-topped tray 10 made of fibrous material and filled with fruit 11. The film of plastics wrapping material is shown at 12. When the articles arrive at the severing and sealing station, the sheet 12 is in a continuous length, and its edge portions are double thickness. This sheet must be severed between each adjacent pair of articles, and the two layers sealed together. After the severing and sealing station the articles pass through a heating tunnel (not shown) where the film 12 is shrunk so that it fits tightly on the wrapped articles.

At the severing and sealing station, there is an anvil roller 13, mounted across the machine, and disposed so that its upper edge is below the top of a feeding conveyor (not shown) which leads the partially wrapped articles to the station. This anvil roller 13 is geared to the machine drive so that it rotates at a surface speed equal to the surface speed of the feed conveyor. Thus, partially wrapped articles leaving the feed conveyor are passed over the anvil roller.

A metal anvil 14 approximately ½ inch thick projects radially from the anvil roller, there being screws 15 which hold the anvil in place in a slot 16 in the roller 13. The top of the anvil 14 is covered with a layer 17 of suitable material which will withstand the heat of sealing but not hold the molten plastics film (such as polytetrafluorethylene). The anvil roller 13 is so arranged relatively to the feed mechanism of the machine that the anvil rises into its top-centre position (as shown in the drawings) behind one article and in front of the next.

Above the anvil roller there is a heater roller 18 arranged across the machine parallel with the anvil roller and rotated at the same angular speed. A shroud 19, which is made in two parts secured together by bolts 20, is mounted on the heater roller 18, and a heater plate 21 is slidable radially in a slot 22 in the shroud. Two legs 23 and 24 extend through slots in the shroud and through mating slots in the roller 18. Holes 25 are drilled diametrically through the roller, and screws 26 passed through these holes engage in screwed holes in the plate 21. As seen in FIGURE 2, the head of each screw 26 lies in a counterbore, and a compression spring 27 surrounds each screw, between its head and the shoulder formed by the bottom of the counterbore. The springs 27 tend to hold the plate 21 in a retracted position where it engages against a shoulder 28 formed in the shroud.

A strip of electrical insulation material 29 is secured by an adhesive to the outer edge of the heater plate 21, and an electric resistance wire 30 which provides the actual severing and sealing member of the arrangement is stretched across the strip 29. The wire 30 is kept under tension by tension springs 31 at each end, the outer ends of these springs being anchored on pivoted terminal posts 32. There are electrical connections (not shown) for supplying an electric current to the wire 30 as required.

The angular disposition of the heater plate 21 on the roller 18 is such that the plate reaches bottom-centre when the anvil 14 is at top-centre, but the size of the shroud 19 is such that at this meeting point in the cycle, there is a narrow gap between the anvil 14 and the shroud.

In the retracted position, the plate 21 does not project from the shroud 19, so that the wire 30 would not meet the anvil 14 if the plate 21 were to remain in this retracted position. Above the heater roller 18 there is a third roller 33 extending across the machine and driven at the same angular speed as the anvil and heater rollers. This third roller will be referred to as the top roller. Fixed on the top roller are two radial arms 34 each carrying a roller 35 at its end, the roller being adapted to engage with and depress the two legs 23 and 24 of the heater plate at the time in the cycle of the meeting of the anvil and casing. Therefore at the meeting point in the cycle, the rollers 35 press the heater plate down into contact with the anvil. The anvil may be spring loaded radially outwards by a block 36 of resilient material so that it can yield under pressure from the heater plate to ensure that the heater plate does engage with the anvil.

The outer edge of the heater plate may be coated with polytetrafluorethylene, with the electric resistance wire 30 stretched across this coated edge of the plate. The electrical connections are arranged so that the wire is heated as it is projected towards the anvil.

Each time the meeting point is arrived at, the two layers of plastics film 12 are nipped between the anvil 14 and the plate 21 and are severed by the hot wire 30. The molten plastics material flows together to seal the two layers together.

Rubber strips 37 are provided in the outer edge of the shroud to assist in holding the film as it is being severed and sealed. Besides the wire 30 (which is round in cross-section) there may be two flat strip wires one on each side of the wire 30, all three wires being heated together. This has been found to give improved sealing with some grades of plastics film.

What I claim is:

1. A heat sealing and severing arrangement for plastics film comprising a rotary anvil carrier, an anvil mounted on said anvil carrier for rotation therewith, a sealer carrier mounted for rotation about an axis parallel with the axis of rotation of said anvil carrier, a sealing and severing member mounted on said sealer carrier for rotation therewith but radially movable relatively to said sealer carrier, resilient means urging said sealing and severing member into a retracted position, driving means for rotating said anvil carrier and said sealer carrier so that said sealing and severing member registers with said anvil at each revolution of said two carriers, said sealing and severing member having an electric resistance heating element laid across it, a cam rotatable about an axis parallel with the axes of said two carriers and operatively connected to said sealing and severing member, means driving said cam in synchronism with said two carriers whereby said cam actuates said sealing and severing member to displace said member from said retracted position against the action of said resilient means to press said member into contact with film at said anvil at the time in the cycle when said sealing and severing member registers with said anvil.

2. The heat sealing and severing arrangement defined in claim 1, wherein said heating element is a wire extending longitudinally along the film engaging surface of said member.

3. The heat sealing and severing arrangement defined in claim 2, wherein said wire is tensioned between spaced electrical terminals on said member.

4. The heat sealing and severing arrangement defined in claim 1, wherein said element is mounted on said member by a length of electrically insulating material.

5. A heat severing and/or sealing arrangement as claimed in claim 1, in which the resistance wire is circular in cross-section and flat resistance wires are laid across the heater plate one on each side of the circular wire.

References Cited

UNITED STATES PATENTS

| | | | |
|---|---|---|---|
| 2,770,936 | 11/1956 | Clark | 156—582 |
| 2,796,913 | 6/1957 | Fener et al. | 156—515 |
| 3,218,218 | 11/1965 | Bratt et al. | 156—582 |
| 3,234,072 | 2/1966 | Dreeben | 156—583 |

DOUGLAS J. DRUMMOND, *Primary Examiner.*

U.S. Cl. X.R.

156—583